United States Patent [19]

Yttergren et al.

[11] Patent Number: 4,629,853
[45] Date of Patent: Dec. 16, 1986

[54] APPARATUS FOR THE INTERNAL WELDING OF PIPES

[75] Inventors: Erik S. Yttergren, Fjugesta; Urban R. A. Strand, Finnerödja; Karl U. H. Jansson; Karl-Erik Knipström, both of Laxå, all of Sweden

[73] Assignee: ESAB Aktiebolag, Gothenburg, Sweden

[21] Appl. No.: 704,467

[22] Filed: Feb. 22, 1985

[30] Foreign Application Priority Data

Feb. 24, 1984 [SE] Sweden ............................. 8401018

[51] Int. Cl.⁴ .............................................. B23K 9/12
[52] U.S. Cl. .............................. 219/60 A; 219/124.03; 219/125.11
[58] Field of Search ............... 219/60 A, 60.2, 124.02, 219/124.03, 125.11

[56] References Cited

U.S. PATENT DOCUMENTS

| | | | |
|---|---|---|---|
| 3,754,115 | 8/1973 | Roberts et al. | 219/60 A |
| 3,987,274 | 10/1976 | Whaley | 219/60 A |
| 4,104,499 | 8/1978 | Luttrell et al. | 219/60 A |
| 4,163,886 | 8/1979 | Omae et al. | 219/60 A |

FOREIGN PATENT DOCUMENTS

| | | | |
|---|---|---|---|
| 1333009 | 9/1962 | France | 219/60.2 |
| 219039 | 9/1968 | U.S.S.R. | 219/124.03 |
| 656779 | 4/1979 | U.S.S.R. | 219/124.03 |

Primary Examiner—Clifford C. Shaw
Attorney, Agent, or Firm—Nils H. Ljungman

[57] ABSTRACT

An apparatus is disclosed for the internal welding of an edge joint between a large main pipe and a small branch pipe, which pipes together form a pipe branch. The apparatus is equipped with a nozzle holder for a non-consumable electrode which forms an acute angle with the axis of the branch pipe, said nozzle holder being introduced into the branch pipe and being capable of axial displacement by means of an actuating mechanism. The nozzle holder is connected to a support holder for a frame attached to the branch pipe. The support holder and the nozzle holder are capable of rotation about the branch pipe. The radial gap between the electrode and the branch pipe is determined by the interaction with a sensor which follows the wall of the pipe. The axial gap between the electrode and the edge joint, that is to say the point of welding, is adjusted by means of a comparison between the arc voltage corresponding to the actual gap and a desired gap arc voltage. The difference voltage controls the actuating mechanism, which displaces the nozzle holder with the electrode so as to reduce this difference voltage.

19 Claims, 3 Drawing Figures

APPARATUS FOR THE INTERNAL WELDING OF PIPES

BACKGROUND OF THE INVENTION

1. Field of the Invention

The present invention relates in general to an apparatus provided for the internal welding of joints between pipes, and more specifically to apparatus for the welding of an edge joint between a branch, first, pipe and a main, second, pipe which pipes together form a pipe branch, wherein the cross section of the first pipe is smaller than that of the second pipe and wherein at least the first pipe is straight.

2. Description of the Prior Art

It is known to provide welding apparatus equipped with a nozzle holder introduced into the first pipe and capable of being displaced axially by a suitable actuating mechanism. The nozzle holder can have at its front end, which projects through the first pipe and into the second pipe, a gas nozzle including a non-consumable stick electrode that forms with the axis of the first pipe an acute angle, and which is connected to a support holder for a frame attached to the first pipe and incapable of angular movement relative to the latter pipe. The support holder together with the nozzle holder can be caused to rotate by a turning arrangement relative to the frame about the axis of the first pipe.

There is described, for example, in U.S. Pat. No. 4,104,499, an electrode capable of rotating about the axis of the first pipe, with the electrode having a tip that follows a circular path. Production tolerances in relation to the pipe frequently give rise to deviations from the precise, circular cylindrical form of the pipe, which deviations can cause variations in the travel length of the arc to have an adverse effect on the quality of the welding. In conjunction with the welding of pipe branches, the electrode must also describe a movement along the axis of the first pipe such that it may follow the line of intersection between the two pipes which make up the welded joint. It is proposed in the aforementioned publication that this axial movement be achieved by means of a cam control system, which also presupposes the extremely high cylindrical accuracy of the pipes with regard to their geometrical form. To compensate for objectionable variations in the dimensions of the pipe, the cam control can be modified to operate in accordance with the branch first pipe in question. A control arrangement which includes such comprehensive modifications in connection with any change to the dimensions of the workpiece substantially increases the difficulty of satisfactory production. Moreover, the complex design of the involved cam makes the resulting cam control system an expensive feature, which must additionally be made available in a large number of variants suited to the actual dimensions of the pipe.

In connection with the internal welding of a branch first pipe, it is particularly desirable that the completed weld should not require any subsequent finishing. Finishing is, in practice, a complicated operation in connection with the welding of small pipes, where the weld is accessible only with difficulty and the visual inspection of the deposited weld is difficult to execute.

OBJECT OF THE INVENTION

It is an object of the present invention to provide a welding apparatus, which is easier to use for the welding of pipe branches of varying dimensions and of different geometrical forms and, in particular, is easy to use for pipes whose form deviates somewhat from the circular cylindrical form.

SUMMARY OF THE INVENTION

The welding apparatus, in accordance with the present invention, is characterized in that a sensor is coupled with the stick electrode and operative with regard to the radial movement of the stick electrode inside the first pipe so as to be forced against the wall of the first pipe. A signal comparator is provided for the purpose of comparing a first signal, corresponding to the existing axial gap between the tip of the stick electrode and the edge joint with regard to the first pipe and a second signal representing a desired axial gap. The signal comparator is operative to generate a fault signal, corresponding to the difference between the first and second signals, to cause an actuating mechanism to provide corrective axial displacement of the stick electrode in a direction which will reduce the aforementioned difference between the first and second signals.

Because of the secure nature of the coupling between the sensor and the electrode, the electrode will follow a movement path which corresponds to the movement path of the sensor over the inner wall of the pipe. In this way, a first component of the total gap, between the electrode and the inner wall of the pipe and thus the point of welding, is determined. The second component of the total gap between the electrode and the point of welding is adjustable by means of the actuating mechanism for controlling the axial displacement of the electrode. The second signal corresponding to the desired axial gap is compared with the first signal which corresponds to the existing actual gap, and the fault signal controls the axial corrective displacement of the electrode until the correct total axial gap, which is composed of the two components referred to above, is reached.

In accordance with a preferred embodiment of the present invention, the first signal is a signal which corresponds to the actual arc voltage, and the signal comparator is operative to compare the first signal with a second signal which corresponds to a desired arc voltage.

In accordance with a preferred embodiment of the present invention, the sensor is forced against the inner wall of the first pipe by means of a tensioned flexible drawspring connected between the sensor and a support holder. It is also particularly advantageous for the sensor to be in contact with that generating line of the inner wall of the first pipe which is intersected by the axis of the electrode. Since the first pipe is straight, the control gap between the electrode and the generating line against which the sensor makes contact is clearly determined and is unaffected by any deviations from the circular form of the pipe. The control gap will not change even when the electrode is displaced in an axial sense with regard to the first pipe.

In accordance with the present invention, it is also advantageous for a first radial distance between the tip of the electrode and the axis of the first pipe to be identical with, or greater by not more than the wall thickness of the first pipe than, a second radial distance between the point of contact of the sensor and the axis of the first pipe. If this first radial distance is smaller, a certain risk will exist that the base of the arc on the workpiece will start to wander in an uncontrollable fashion over the inner wall of the first pipe in the direction of the opening of the branch pipe. If this first radial distance is greater, a certain risk will exist that the quality of the welding will not be acceptable because of incomplete penetration in one of the two pipes. It has also been found that finishing of the weld will not be required, in general, if this first radial distance at the tip of the electrode has a value within the indicated limits.

In the case of thin-walled pipes in particular, the penetration can reach as far as the root side of the edge joint, where the material is exposed to the surrounding atmosphere, and this has an adverse effect on the quality of the welding. In accordance with a preferred embodiment, therefore, the arrangement is provided with a sleeve-shaped protective cover capable of being slid over the first pipe and so arranged as to cover the root side of the edge joint, in which case the cover has an external shape which matches the outer wall of the second pipe and forms, together with the two pipes at the root side, an annular chamber which is capable of being connected to a source of inert gas.

BRIEF DESCRIPTION OF THE DRAWINGS

Further advantages of the invention are apparent from the following specification in conjunction with the accompanying drawings which illustrate a typical embodiment of the invention.

DESCRIPTION OF THE PREFERRED EMBODIMENT

Figure 1:
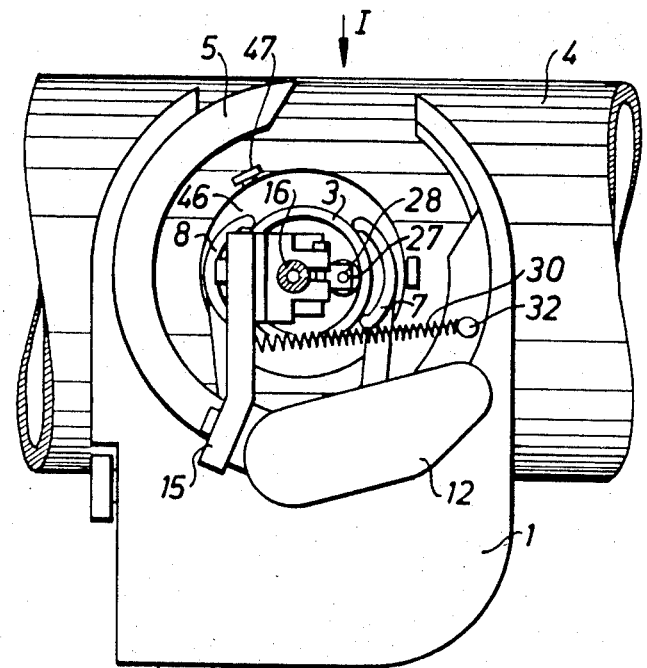
FIG. 1 shows a pipe welding apparatus viewed from above.
Figure 2:
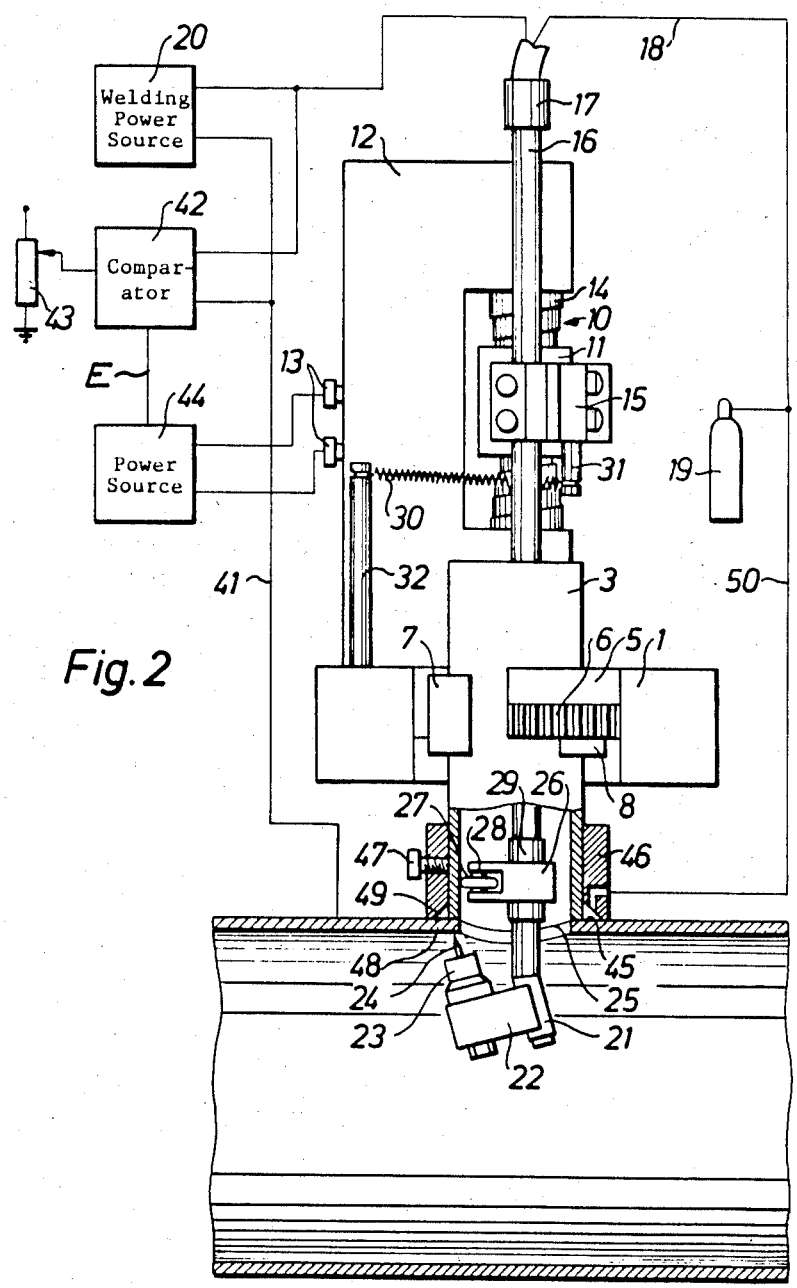
FIG. 2 shows a side view of the pipe welding apparatus viewed in the direction of arrow I in FIG. 1.

As shown in FIG. 1, the present pipe welding apparatus has a U-shaped frame 1 including a handle 2 and positioned with the opening of the U-shaped frame 1 over a branch, first, pipe 3, which is to be welded to a second pipe 4. A C-shaped holder 5 is mounted in the frame 1 in such a way as to be free to rotate. When the holder 5 is in its rest position, the openings of the frame 1 and the holder 5 are in line with each other. The holder 5 is shown in FIG. 1 to have been rotated slightly in relation to said rest position. The holder 5 is rotated with the help of a motor mounted in the handle 2 via a geared drive (not shown) that is built into the frame 1. A section of a gear ring 6 of the holder 5 which interacts with the geared drive is shown in FIG. 2. The frame 1 also contains a clamping mechanism including two clamping jaws 7 and 8. The clamping jaws 7 and 8 are forced by means of a lever 9 connected to the mechanism against the branch, first, pipe 3 in such a way that the frame 1 is securely attached to the branch, first, pipe 3. A clamping arrangement of this kind is described, for example, in British Pat. No. 1 416 853.

As shown in Fig. 2, on the rotatable holder 5 is mounted a ball and screw spindle 10 with a slide 11 and with a drive motor with terminals 13 built into the sleeve 12. A spindle, which is not visible here, is covered by a telescopic spring 14 which protects the spindle against dirt.

To the slide 11, which is able to slew about the axis of the ball and screw spindle 10, is attached an arm 15 for supporting at one of its ends a tubular nozzle holder 16 which is parallel with the axis of the spindle 10 and the axis of the branch, first, pipe 3. The nozzle holder 16 comprises a copper tube and is provided at its rear end with a nipple 17, to which is connected a gas line 18 containing a electric conductor. The gas line 18 is connected to a vessel 19 containing inert gas, and the electric conductor is connected to a source 20 of welding current. These lines are illustrated here only in schematic form.

The nozzle holder 16 is slightly bent at its front end 21. To the bent front end 21 is soldered mounting 22 for a gas nozzle 23 with a non-consumable stick electrode 24, the tip of which is directed towards the edge joint 25 formed by the branch, first, pipe 3 and the second pipe 4. To the straight part of the nozzle holder 16, which is inserted into the branch, first, pipe 3, is attached a mounting 26 for a small wheel 27 which is able to rotate about an axis 28 parallel with the branch, first, pipe 3. The mounting 26 is insulated from the nozzle holder 16 by means of an insulating sleeve 29. A drawspring 30 is tensioned between an attachment 31 on the arm 15 and an attachment 32 on the holder 5. The drawspring 30 will attempt to cause the arm 15 with the nozzle holder 16 to slew in a clockwise direction (as shown in FIG. 1) about the axis of the ball and screw spindle 10, such that the small wheel 27 is accordingly forced to ride against the inner wall of the branch, first, pipe 3. The small wheel 27 and the electrode 24 are securely connected to each other by means of the mounting 26, the nozzle holder 16, the mounting 22 and the gas nozzle 23. The electrode 24 is mounted in the gas nozzle 23 in such a way that the axis of the electrode 24 intersects the generating line of the inner wall of the branch, first, pipe 3 against which the small wheel 27 makes contact. The axis of the electrode 24, the axis 28 of the small wheel 27 and the axis of the nozzle holder 16 thus lie in the same plane. The radial gap between the electrode 24 and the branch, first, pipe 3 or its imaginary prolongation inside the second pipe 4 is determined in this way and is unrelated to the cross-sectional form of the branch, first, pipe 3, which will be somewhat elliptical in most cases because of the manufacturing tolerances.

Figure 3:
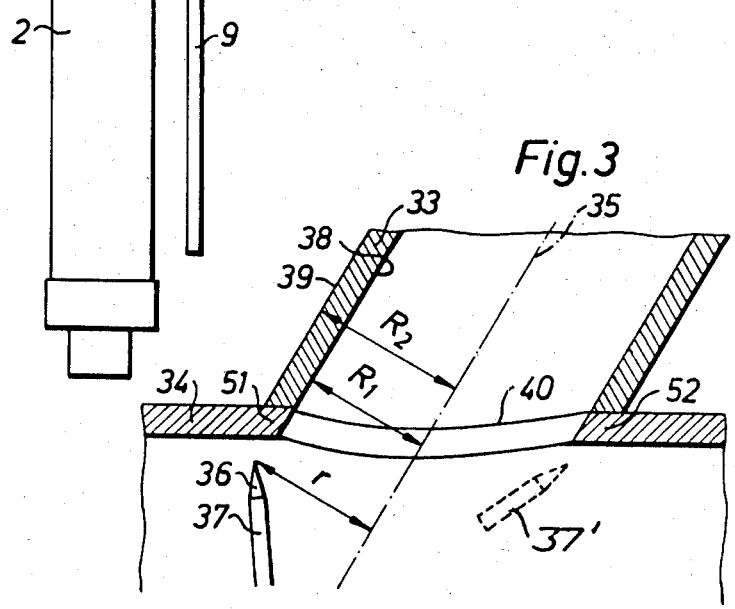
FIG. 3 shows in schematic form the position of the welding stick electrode in relation to the two pipes which are to be welded.

Shown in somewhat schematic form in FIG. 3 is the radial gap at which the tip 36 of the electrode 37 should preferably be positioned in order to achieve a high quality of welding. Illustrated here is a different branch, first, pipe 33, the axis of which forms an acute angle with a main pipe 34. The axis 35 of the branch, first, pipe 33 is shown as a dashed line. The tip 36 of the electrode 37 shown here only schematically is situated at a radial gap r from the axis 35, in respect of which the relationship $R_2 \geq r \geq R_1$ shall apply, where $R_1$ is the radial gap between the axis 35 and the inner wall 38 of the branch, first, pipe 33 and $R_2$ is the radial gap between the axis 35 and the outer wall 39 of the branch, first, pipe 33. This dimensioning rule is based on the assumption that the tip 36 of the electrode 37 must at all times be positioned within the space enclosed by the pipe 34. The open angle to the branch, first, pipe 33 between the electrode 37 and the axis 35 is acute and is preferably less than 60°. In certain cases it may be considered desirable for the angle to be 0°, that is to say for the axis of the electrode to be parallel with the axis of the nozzle holder 16. The axial gap with regard to the branch, first, pipe 33 between the tip 36 of the electrode 37 and the edge joint 40 formed by the branch, first, pipe 33 and the main pipe 34, that is to say the point of welding, is controlled in the same manner as is described below with reference to the pipe welding apparatus illustrated in FIG. 1 and 2.

As shown in FIGS. 1 and 2, the source 20 of welding current is connected partly via the nozzle holder 16 to the electrode 24 and partly via a return lead 41 connected to the second pipe 4 in the vicinity of the point of welding. The actual voltage between the electrode 24 and the second pipe 4 is fed into a comparator 42, inside which said actual voltage is compared with a desired voltage which is adjustable by means of a potentiometer 43. The desired voltage corresponds to a predetermined distance between the electrode 24 and the edge joint 25. A fault signal E corresponding to the difference voltage between the measured actual voltage and the potentiometer desired voltage is transmitted to a power source 44 for the drive motor of the ball and screw spindle 10 connected to the terminals 13. The power source 20 will remain connected for as long as the aforementioned fault signal E is present, and the motor of the ball and screw spindle 10 will cause the slide 11 to move along the spindle 10 in such a way that the axial gap between the electrode 24 and the point of welding will be changed in such a direction that the fault signal E will be caused to reduce. Together with the fixed radial gap between the electrode and the point of welding, a change will also be made to the total gap until this assumes a value corresponding to the setting of the potentiometer 43.

The welding operation produces an edge joint 25, the root side 45 of which must be protected against oxidation by the surrounding air. A sleeve-shaped protective cover 46 is applied in such a way as to provide a good fit to the branch, first, pipe 3 and is attached to the latter by means of a number of bolts 47. The front surface of the protective cover 46 facing the second pipe 4 matches the cylindrical surface of the main, second, pipe 4 and is thus in close contact with the latter. The cover 46 is somewhat tapered in that section which faces the root side 45 and forms together with the branch, first, pipe 3 and the main second pipe 4, an annular chamber 49, which enclosed the root side 45. Into the chamber 49 is supplied from the inert gas container 19 via a line 50 an inert gas which effectively prevents access to the root side 45 by the atmospheric air.

The branch, first, pipe 3 and the main, second, pipe 4 are attached to each other by means of tack welding before the pipe welding apparatus is applied to the branch, first, pipe 3. When the welding apparatus is being prepared and not yet in position to weld the edge joint 25, the inert gas cover 46 is pushed onto the branch, first, pipe 3 and is secured to the latter by means of the bolts 47. The pipe welding apparatus is then moved, in conjunction with which the nozzle holder 16 is rotated slightly about the axis of the spindle 10, towards the center of the branch, first, pipe 3, whereupon it is introduced into the branch, first, pipe 3 in such a way that the gas nozzle 23 is free of the branch, first, pipe 3. Once the nozzle holder 16 has been introduced into the branch, first, pipe 3 for a sufficient distance to permit the axial gap between the electrode 24 and the edge joint 25 to have more or less the correct value, the pipe welding apparatus is clamped in position on the branch, first, pipe 3 by means of the clamping jaws 7 and 8 and the nozzle holder 16 is released. The small wheel 27 is forced by the spring 30 against the inner wall of the branch, first, pipe 3 and the radial gap of the electrode 24 is determined in this way. As soon as the arc has been struck between the electrode 24 and the pipes, the electrode gap is adjusted in the manner described above. The driving around of the electrode 24 within the branch, first, pipe 3 is then effected by rotation of the motor-driven holder 5.

It is within the scope of the present invention to make use of an inner gas cover 46 of a length such that the frame 1 of the pipe welding apparatus can be clamped securely to it. If a cover 46 of this kind is used, then it will not be necessary when welding a branch, first, pipe 3 which extends upwards from the large main, second, pipe 4 to clamp the inert gas cover 46 to the branch, first, pipe 3 before the welding apparatus is secured relative to the branch, first, pipe 3. Because of the weight of the cover 46 and the weight of the pipe welding apparatus clamped to it, the front surface of the cover 46 which matches the periphery of the large second pipe 4 will be a close fit with the latter second pipe 4. Since the inner diameter of the cover 46, as has already been mentioned above, is also well matched to the outer diameter of the branch, first, pipe 3, the position of the frame 1 relative to the branch pipe 3 will not change during the welding operation.

It is also within the scope of the present invention to regulate the electrode gap and to vary the welding parameters in accordance with a predetermined program with regard to the positional angle of rotation of the electrode 24 as it is caused to rotate along the edge joint. The program control of the welding operation is particularly advantageous when welding a pipe edge joint between two pipes which meet at an angle which differs considerably from 90°, since the welding conditions will be altered significantly by the changing form of the edge joint. The pipes meet at an angle of 60° in the pipe edge joint illustrated in FIG. 3. The welding of the edge joint at a point of welding 51, where the two walls of the pipes form an obtuse angle, will call for different welding control parameters than are applicable at the diametrically opposite point of welding 52, where the two walls of the pipes form an acute angle. As a result, the electrode 37', which is shown by a broken line, adopts a different angular position in relation to the point of welding 52 as compared to the angular position at the point of welding 51. The change in the welding control parameters takes place progressively as the electrode 37 is caused to rotate inside the branch, first, 33 pipe and is dependent upon the form of the edge joint at the points of welding 51 and 52.

The invention is not to be taken as limited to all the details that are described hereinabove, since modifications and variations thereof may be made without departing from the spirit or scope of the invention.

What is claimed is:

1. In an apparatus for the internal welding of an edge joint between a straight first pipe with a wall of known thickness and a central longitudinal axis, and a second pipe which together with said first pipe forms a pipe branch having an edge joint, said first pipe having a cross section which is smaller than the cross section of said second pipe, said apparatus including a nozzle holder for being introduced into said first pipe and capable of being displaced along said central, longitudinal axis of said first pipe, said nozzle holder projecting into said second pipe, in use, and including an electrode having an axis and a tip, said axis of said electrode forming, in operation, an acute angle with said central, longitudinal axis of said first pipe, said nozzle holder and said electrode being rotatable in use about said central, longitudinal axis of said first pipe, the combination of:

positioning means connected to and supporting said electrode and operative with an inside wall of said first pipe for automatically positioning of said electrode in relation to its radial gap to the edge joint;

means for continuously generating a first signal corresponding to an actual gap in the direction of said central longitudinal axis between said tip of said electrode and said edge joint;

reference means for generating a second signal representing a desired gap between said tip of said electrode and said edge joint in the direction of said central, longitudinal axis of said first pipe;

comparator means for comparing said first signal with said second signal and for generating a fault signal corresponding to a difference between said first and said second signals, and motor means responsive to said fault signal for providing axial displacement of said electrode in a direction of said central, longitudinal axis of said first pipe to reduce said fault signal, whereby said electrode tip accurately tracks said edge joint even in the event of said first pipe being non-circular, and even with said first pipe and said second pipe being disposed at an angle which would result in an oblong edge joint lying on a substantially nonplanar surface.

2. The apparatus in accordance with claim 1, with said first signal generating means generating said first signal corresponding to a sensed arc voltage across said actual gap, with said reference means generating a desired arc voltage signal corresponding to a voltage required to bridge across said desired gap, and with said comparator means comparing said sensed arc voltage signal and said desired arc voltage signal for generating said fault signal.

3. The apparatus in accordance with claim 2, including means to move said positioning means to contact said inside wall of said first pipe for positioning said electrode.

4. The apparatus in accordance with claim 3, wherein said first pipe and said second pipe are at an acute angle, with said positioning means being disposable in operation to make contact with a line on said inside wall of said first pipe which is intersected by said axis of said rotatable electrode.

5. The apparatus in accordance with claim 4, wherein said positioning means comprises a guide wheel disposed inside said first pipe and having an axis of rotation substantially parallel with said central, longitudinal axis of said first pipe.

6. The apparatus in accordance with claim 5, with said second pipe having an outer wall and with said edge joint having a root side, and including a sleeve shape protective cover for sliding over said first pipe to cover the root side of said edge joint and having an external shape which matches said outer wall of said second pipe to form, together with said first pipe and said second pipe, at said root side an annular chamber capable of containing inert gas.

7. The apparatus in accordance with claim 4, wherein said radial gap is substantially the same, or greater by not more than the wall thickness of said first pipe, as compared to a distance between the point of contact of said positioning means with said inside wall of said first pipe and said central, longitudinal axis of said first pipe.

8. The apparatus in accordance with claim 2, wherein said first pipe and said second pipe are at an acute angle, with said positioning means being disposable in operation to make contact with line on said inside wall of said first pipe which is intersected by said axis of said rotatable electrode.

9. The apparatus in accordance with claim 8, wherein said positioning means comprises a guide wheel disposed inside said first pipe and having an axis of rotation substantially parallel with said central, longitudinal axis of said first pipe.

10. The apparatus in accordance with claim 9, including resilient means which biases said guide wheel into engagement with an inner surface of said first pipe.

11. The apparatus in accordance with claim 8, wherein said radial gap is substantially the same, or greater by not more than the wall thickness of said first pipe, as compared to a distance between the point of contact of said positioning means with said inside wall of said first pipe and said central, longitudinal axis of said first pipe.

12. The apparatus in accordance with claim 2, wherein said reference means includes an adjustable potentiometer.

13. The apparatus in accordance with claim 1, including means to move said positioning means to contact said inside wall of said first pipe for positioning said electrode.

14. The apparatus in accordance with claim 12, wherein said first pipe and said second pipe are at an acute angle, with said positioning means being disposable in operation to made contact with a line on said inside wall of said first pipe which is intersected by said axis of said rotatable electrode.

15. The apparatus in accordance with claim 14, wherein said positioning means comprises a guide wheel disposed inside said first pipe and having an axis of rotation substantially parallel with said central, longitudinal axis of said first pipe.

16. The apparatus in accordance with claim 14, wherein said motor means includes a ball and screw spindle mechanism for effectuating said axial displacement of said electrode in a direction of said central longitudinal axis.

17. The apparatus in accordance with claim 14, including a gas nozzle disposed in the region of said electrode, said nozzle being connected to a source of an inert gas and being mounted for displacement together with said electrode.

18. The apparatus in accordance with claim 14, wherein said radial gap is substantially the same, or greater by not more than the wall thickness of said first pipe, as compared to a distance between the point of contact of said positioning means with said inside wall of said first pipe and said central, longitudinal axis of said first pipe.

19. Apparatus for performing automatic internal welding of an edge joint between a first straight pipe with a wall of known thickness and a central longitudinal axis, and a second pipe intersecting said first pipe at an angle, to form a pipebranch having said edge joint, said apparatus including:

a welding electrode having a tip;

a welding nozzle holder for holding said welding electrode and for being introduced into said first pipe and having a first means to rotate said nozzle holder about said longitudinal axis during welding, and a second means to selectively impart a translating motion to said welding nozzle in the direction of said longitudinal axis;

said first means further comprising positioning means connected to and supporting said welding electrode disposed at said nozzle holder;

said positioning means comprising a guiding member which responds to contour variations inside of said first straight pipe when said nozzle holder rotates about said longitudinal axis, said positioning means automatically positioning said welding electrode at a required radial gap to said edge joint;

signal generating means for continuously generating a first signal corresponding to an actual axial gap in said direction of said longitudinal axis between said tip of said electrode and said edge joint; and comparator means for continuously comparing said first signal with a second reference signal representing a desired axial gap between said tip of said electrode and said edge joint, to generate a fault signal, said comparator means being connected to respond to said fault signal so as to act to reduce said fault signal, whereby said electrode tip accurately tracks said edge joint even in the event of said first pipe being somewhat non-circular, and even when said first pipe and said second pipe are disposed to form a pipebranch at an angle which would result in an oblong edge joint lying on a substantially nonplanar surface.

* * * * *